United States Patent [19]

Kattenberg et al.

[11] 4,016,302
[45] Apr. 5, 1977

[54] MARGARINE FAT BLEND

[75] Inventors: Hans Robert Kattenberg; Cornelis Poot, both of Vlaardingen, Netherlands

[73] Assignee: Lever Brothers Company, New York, N.Y.

[22] Filed: Sept. 8, 1975

[21] Appl. No.: 610,957

Related U.S. Application Data

[63] Continuation of Ser. No. 433,953, Jan. 16, 1974, abandoned.

[52] U.S. Cl. ............................................. 426/607
[51] Int. Cl.² .......................................... A23D 5/00
[58] Field of Search .................. 426/606, 607, 601

[56] References Cited

UNITED STATES PATENTS

| | | | |
|---|---|---|---|
| 3,353,964 | 11/1967 | Seiden | 426/607 |
| 3,361,568 | 1/1968 | Kidger | 426/606 X |
| 3,597,230 | 8/1971 | Colby et al. | 426/607 |

Primary Examiner—A. Louis Monacell
Assistant Examiner—R. A. Yoncoskie

[57] ABSTRACT

The invention provides fat blends e.g. suitable for preparing margarines containing high porportions of palm-based fats, partly in co-randomised form, the fat blends having a ratio of PUP:PPU triglycerides of less than 2.8, the $Sa_3$ content being greater than $P_2U$-8.

3 Claims, No Drawings

MARGARINE FAT BLEND

This is a continuation of application Ser. No. 433,953, filed Jan. 16, 1974, now abandoned. The present invention relates to fat blends containing palm-based fats, which blends are suitable for the preparation of emulsified food spreads, especially margarine, and which can also be used in preparing shortenings.

The use of palm-based fats as a major constituent in fat blends e.g. intended for use as margarine fat is often advantageous, since palm-based fats are often less expensive and more readily available than various other fatty raw materials of comparable quality. The widespread use of palm oil and its hydrogenated and/or fractionated derivatives in the preparation of fat blends, emulsions etc. has been handicapped in the past particularly by the slow rate of crystallisation of the palm-based fats and the crystal-defects of the crystallised products.

In order to overcome a major disadvantage often associated with palm-based fats, i.e. its slow rate of crystallisation, which can give rise to packing difficulties, the product being generally too soft when it is first produced and later becoming too hard, the palm-based fats are often co-randomised with different fats.

Crystallised co-randomised palm-based fat containing fat blends very often show still other defects. Particularly the phenomenon of "graininess", by which is understood the formation of large grain-like crystal aggregates in the fat blend upon storage, is often due to the presence of palm-based fat is co-randomised form.

The present invention provides an improved fat blend containing 30–80% of palm-based fat, in which part of the palm-based fat is co-randomised with one or more other fats which pre-dominantly consist of $C_{44}$ and higher triglycerides, the fat blend having a PUP:PPU ratio of less than 2.8, the $Sa_3$ content being greater than $P_2U$-8.

By the PUP-PPU ratio is to be understood the weight ratio of the 1,3-dipalmitoyl-2-unsaturated triglycerides (PUP), and the 1,2-dipalmitoyl-3-unsaturated triglycerides (PPU) of the fat blend. By the unsaturated fatty acids of the PUP and PPU triglycerides are meant the cis-mono and polyunsaturated fatty acids.

$Sa_3$ triglycerides are triglycerides having three saturated fatty acids of a mean chain length of 44/3 or higher, particularly triglycerides of palmitic, stearic and longer chain saturated fatty acids.

It has surprisingly been observed that the fat blend of the invention having a PUP:PPU ratio of less than 2.8 and an $Sa_3$ content of more than $P_2U$-8, as well as the emulsion or margarine prepared therefrom does not become unacceptably grainy upon storage.

The invention particularly provides a fat blend suitable for the preparation of emulsions, particularly margarine, having dilatation values at 10° C of at most 1100, at 20° C of at least 200 and at 35° C of not more than 175 particularly less than 75. The dilatation values as described in this specification were measured as described in H. A. Boekenoogen. "Analysis and Characterization of Oils, Fats and Fat Products", Vol I, 1964, Interscience Publishers, London, pp 143 et seq.

The term "fat" is used in this specification to include fatty acid triglycerides which are solid at 20° C and are commonly described as "fats" as well as triglycerides which are liquid at that temperature and which are commonly described as "oils". The term "liquid oil", which is also used in this specification refers to triglycerides which are liquid at 5° C, preferably at 0° C. A "fatty phase" is a fat or fat blend which can include liquid oils and which is suitable as the sole fat blend in the emulsions of the invention. Similarly a "margarine fat" is a fat blend which can also contain liquid oils and which is suitable as the fatty phase in margarine. Unless stated otherwise, the terms "emulsion", "margarine", "food spead" etc. refer to water-in-fat emulsions containing the fat blends of the invention and also suitable amounts of fat-soluble emulsifiers, e.g. partial fatty acid glycerides like monoglycerides, phosphatides, and fractions thereof, etc. and/or water-soluble emulsifiers, e.g. partial glycerides, phosphatides, egg yolk, protein etc.

The term "randomising" refers to the interchange of the fatty acid radicals of the glycerides on the glyceryl radicals in random fashion. This interchange, when applied to at least two different fat sources is called "co-randomising" and can e.g. be effected under the influence of an interesterification catalyst at temperatures of about 25°–175° C, preferably 80 –140° C. Suitable catalysts are alkali metals, their alloys, their hydroxides, their alkoxides e.g. in proportions of 0,01% to 0,3 or 0,5% by weight.

The fat blend according to the invention is particularly of importance in emulsions containing from 40 or 50 up to 85% of a fatty phase, the balance of the emulsion being an aqueous phase, which can be water, milk or skim milk adjusted to the required pH value e.g. of about 4 or 4.5 to 6 or 7 and which can contain, apart from suitable water-soluble emulsifiers, various minor ingredients e.g. salt, acid, protein, flavours, preservatives etc.

In this specification all percentages, proportions and parts are by weight unless otherwise specified. The amount of fat in the emulsion is based on the weight of the emulsion, the amount of fat in the fat blend is based on the weight of the fat blend and the amount of fatty acids in a fat on the total amount of fatty acids in said fat, unless stated otherwise.

The terms palm-based fat as used in this specification includes both hydrogenated and unhydrogenated palm oil as well as solid and liquid fractions thereof. The palm-based fat should be present both in co-randomised and in non-randomised form in the fat blend of the invention. Preferably 15–85% of the total palm-based fat content is co-randomised, leaving 15–85% of the total palm-based fat content in non-randomised form.

By fats which predominantly consist of $C_{44}$ and higher triglycerides are understood non-palm-based fats and liquid oils of which at least 90% of the triglycerides contain fatty acids of a mean chain length of 44/3 and higher. Such fats can either be used as such or in the form of their hydrogenated and/or fractionated derivatives. Examples of "$C_{44}$ and higher triglyceride" fats are soyabean oil, safflower oil, sunflower oil, rapeseed oil, marine oil, cottonseed oil, groundnut oil, rice bran oil etc. and their hydrogenated and/or fractionated derivatives. Preferably 10–100% of the total content of fat which predominantly consists of $C_{44}$ and higher triglycerides is co-randomised.

It will be evident to the expert that with a given number of raw materials the amount of palm-based fat which is co-randomised with the other fat can easily be determined by simple experiment so as to obtain a fat blend with the required PUP:PPU ratio being less than 2.8 and the amount of $Sa_3$ being greater than $P_2U$-8. The amounts of PUP and PPU and $Sa_3$ triglycerides in the fat blend are calculated from their contents in the raw materials used. These contents can be calculated from the total fatty acid compositions and the fatty acid composition of the 2-monoglycerides obtained by enzymatic hydrolysis with pancreatic lipase according to M. H. Coleman described in J. of Am. Oil Chem. Soc. 38 (1961), 685-8.

It will also be evident to the expert that the type of fat and the amount thereof, with which part of the palm-based fat co-randomised, is equally governed by the above-mentioned factors.

The balance of the fat blend can consist of the remainder of the palm-based fat, or can comprise other fats blended therewith. The non-randomised fats can be of any type, provided the requirement of $P_2U-8<Sa_3$ of the total margarine fat is met. Examples of such oils are coconut, palm kernel, safflower, sunflowerseed, soyabean oil and so on, which may be hydrogenated or fractionated.

Suitable proportions of co-randomised constituents are from 25–98% of the total fat blend.

Preferably the fat with which the palm-based fat is co-randomised, i.e. the other fat which predominantly consists of $C_{44}$ and higher triglycerides is partially hydrogenated so as to reduce its U-content preferably without increasing the Sa content, since thereby the dilatation value at 35° C can detrimentally be affected, such a hydrogenation treatment is preferably effected under trans-acids promoting conditions which are well known to the expert.

As already stated the content of the various triglycerides present in the fat blend of the invention can be calculated from the composition of the raw materials used.

The raw materials used in the accompanying examples have a triglyceride and a fatty acid composition as shown in Table I. In this Table $Sa_3$ stands for a triglyceride having three saturated fatty acids of a mean chain length of 44/3 or higher and Sa for a fatty acid of a chain length of 44/3 or higher. The content of PUP, PPU and $Sa_3$ triglycerides can be calculated as follows:

a. Fatty acid composition co-randomised part of the fat blend:

$$C_i^P = \text{sum } (g_{ri} \times C_r^P) \quad (1)$$

in which $C_i^P$ = amount of fatty acid P is randomised part $i$ calculated on total amount of fatty acids in co-randomised part $g_{ri}$ = amount of raw material $r$ in randomised part $i$ calculated on total amount of co-randomised part $C_r^P$ = amount of fatty acid P in raw material $r$ calculated on total amount of fatty acids in raw material $r$.

b. Triglycerides in co-randomised part of the fat blend:
$$PUP_i = P_i^2 \times U_i/10000 \quad (2)$$

$$PPU_i = 2 \times PUP_i \quad (3)$$

$$Sa_{3i} = Sa_i^3/10000 \quad (4)$$

c. Triglycerides in total fat blend:
$$PUP_m = g_i \times PUP_i + \text{sum } (g_r \times PUP_r) \quad (5)$$

$$PPU_m = g_i \times PPU_i + \text{sum } (g_r \times PPU_r) \quad (6)$$

$$Sa_{3m} = g_i \times Sa_{3i} + \text{sum } (g_r \times Sa_{3r}) \quad (7)$$

in which $g_i$ = amount of co-randomised part in fat blend $m$ calculated on total fat blend $g_r$ = amount of non-randomised raw material $r$ in fat blend $m$, calculated on total fat blend $PUP_i$, $PPU_i$ and $Sa_{3i}$ = amounts of PUP, PPU and $Sa_3$ in co-randomised part $PUP_r$, $PPU_r$ and $Sa_{3r}$ = amounts of PUP, PPU and $Sa_3$ in raw material $r$ $PUP_m$, $PPU_m$ and $Sa_{3m}$ = amounts of PUP, PPU and $Sa_3$ in total fat blend $m$.

The triglyceride composition of a margarine fat consisting of
  24% of palm oil
  16% of sunflower oil
  60% of a co-randomised blend of
    60 parts of palm oil and
    40 parts of sunflower oil
can thus be calculated as follows:

a. Fatty acids in co-randomised part according to equation (1) (cf. Table I)
  $P_i = 0.6 \times 44.5 + 0.4 \times 6.5 = 29.2\%$
  $U_i = 0.6 \times 49.6 + 0.4 \times 89.8 = 65.7\%$
  $Sa_i = 0.6 \times 49.4 + 0.4 \times 10.0 = 33.6\%$ b. Triglycerides in co-randomised part according to equations (2), (3) and (4)
  $PUP_i = 29.2^2 \times 65.7/10.000 = 5.6\%$
  $PPU_i = 2 \times 5.6 = 11.2\%$
  $Sa_{3i} = 33.6^3/10.000 = 3.8\%$ c. Triglycerides in margarine fat according to equations (5), (6) and (7) (cf. Table I)
  $PUP_m = 0.6 \times 5.6 + 0.24 \times 35.8 + 0.16 \times 1.0 = 12.1\%$
  $PPU_m = 0.6 \times 11.2 + 0.24 \times 6.0 + 0.16 \times 0.1 = 8.3\%$
  $Sa_{3m} = 0.6 \times 3.8 + 0.24 \times 7.0 + 0.16 \times 0.0 = 4.0\%$
  $P_2U_m = PUP_m + PPU_m = 20.4\%$
  $PUP:PPU = 12.1 : 8.3 = 1.5$ The margarines can be prepared by emulsifying a suitable aqueous phase in a suitable proportion in the fat blend of the invention and chilling and working the mass in a conventional manner. The aqueous phase can contain additives which are customary for margarine, for example emulsifying agents, salt and flavours. Oil-soluble additives e.g. flavouring compounds, vitamins etc. can be included in the fatty phase. Generally the proportion of fatty phase in a margarine varies from about 75 to 85% of the emulsion depending on local statutory requirements for margarine. Alternatively higher proportions of the aqueous phase can be adopted in the production of so-called low-fat spreads, which can contain as little as 35, 40 or 50 up to 60% by weight of fat.

The emulsions, particularly the margarine, can be manufactured in a conventional closed tubular surface-scraped exchanger as described in "Margarine" by A. J. C. Andersen and P. N. Williams, Pergamon Press 1965, pp. 246 et seq. Votator arrangements described in British patent specification 639,743, British patent specification No. 650,481 and British patent specification No. 765,870 are particularly suitable. Alternatively, emulsions can be prepared by means of a phase inversion process as described in British patent specification 1,215,868 or on conventional cooling drums as described in the same block by Anderson and Williams.

The invention will be illustrated by the following examples:

EXAMPLE I

A margarine was prepared from a margarine fat consisting of palm oil, hardened to a melting point of 58° C and a co-randomised mixture of 60% palm oil and 40% sunflowerseed oil. In Table II the composition of the margarine fat and that of a control sample are compiled. The margarines were prepared as follows:

The margarine fat blend was melted and emulsified with an aqueous phase prepared from soured milk containing 0.1% monodiglycerides to give an emulsion containing 80% of fat.

The emulsion was crystallised and worked in a closed tubular surface-scraped heat exchanger (Votator A-unit), which was left at a temperature of 15°-20° C. The cooling temperatures in the A-unit were from -6° C to -10° C and 40% of the treated emulsion was recirculated. Thereafter the crystallised emulsion was passed through a resting tube (Votator B-unit), where it crystallised further for 100-200 sec. and was packed.

The margarine according to the invention and the one prepared from the control sample were stored for 8 weeks at 15° C and then microscopically judged for graininess by the following scale.

1-2 = not to negligible grainy
3-4 = becoming grainy to acceptable graininess
5-6 = grainy to very grainy.

EXAMPLES II-IV

Margarines were prepared as described in Example I from various margarine fats as shown in Table III. These margarines were assessed for graininess as described in Examples I. The results are also shown in Table III.

EXAMPLES V-XXII

Margarines were prepared as described in Example I and judged on graininess after storage at 15° C as described in Example I. The results are compiled in Table IV.

All margarine fats prepared had dilatation values at 10° C of below 1100, at 20° C of above 200 and at 35° C of less than 175.

The hydrogenated fats present in both the randomised and the non-randomised part of the fat blends described in the Examples were hydrogenated to a melting point of 25°-70° C.

Except soyabean oil all fats were prepared by hydrogenating the fats or liquid oil in a conventional iso-promoting way to semi-solid or solid fats having a melting point mostly between 25° and 45° C. Fats of such melting points generally have relatively few saturated fatty acids, particularly at most 35%, and have a trans-fatty acid content of at least 20%, preferably at least 30 to 40%. An iso-promoting sulphur-poisoned hydrogenation catalyst was used in the hydrogenation of such oils, (about 1.5% of a sulphur-poisoned nickel catalyst precipitated on kieselguhr and the hydrogenation was effected at temperatures varying from about 140° C to 180° C until the desired melting point was obtained.

The hydrogenation treatment of soyabean oil was effected with non-poisoned nickel catalyst precipitated on kieselguhr. Soyabean oil with a melting point above 30° C was hydrogenated in two stages, i.e. in the first stage with a fresh and in the second stage with a sulphur-poisoned catalyst, first at about 90° to 120° C and subsequently at about 170-190° C until the desired melting point was obtained.

Dry-fractionation of the palm-based fats used in the fat blends of the invention was carried out by heating the fat to a temperature of about 50° or 60° C, and cooling the liquid fat obtained to 40° C, followed by a gradual cooling in about 4 hours to about 15° to 35° C. The mass obtained was subsequently kept at this temperature for a period of about 1.5 to 3 hours, after which the solid fraction (stearin) was separated from the liquid fraction (olefin) by filtration.

Wet fractionation of palm-based fats was effected by mixing about 1 part of fat with one part of acetone, leaving the mixture at 2°-15° C for several hours and separating the stearins from the oleins by filtration.

TABLE I

Triglyceride and fatty acid composition of exemplified fats

| Raw material | Triglycerides | | | Fatty Acids | | |
|---|---|---|---|---|---|---|
| | PUP | PPU | $Sa_3$ | P | Sa | U |
| Groundnut oil | 3,5 | 0,5 | 0,2 | 11,4% | 20.5% | 79,2% |
| Groundnut oil, hydrogenated to a melting point of 37° C | 0,3 | 0,0 | 1,7 | 11,3 | 24,5 | 16,0 |
| Soyabean oil | 2,6 | 0,4 | 0,1 | 11,1 | 15,5 | 84,5 |
| Spyabean oil, hydrogenated to a melting point of: | | | | | | |
| 28° C | 2,5 | 0.3 | 0,4 | 11,0 | 18,0 | 51.5 |
| 36° C | 0,5 | 0,1 | 0,7 | 11,2 | 21,6 | 13,1 |
| 41° C | 0,4 | 0,1 | 1,4 | 11,0 | 27,0 | 20,0 |
| 69° C | 0,0 | 0,0 | 98,0 | 11,3 | 98,5 | 0,0 |
| Beef tallow | 5,7 | 7,5 | 10,3 | 24,1 | 49,4 | 47,3 |
| Coconut oil | 0,5 | 1,0 | 0,0 | 8,1 | 10,6 | 9,2 |
| Cottonseed oil | 17,4 | 1,4 | 0,6 | 27,3 | 29,6 | 69,6 |
| Fish oil, hydrogenated to a melting point of: | | | | | | |
| 33° C | 0,5 | 1,4 | 2,5 | 22,1 | 31,0 | 4,5 |
| 35° C | 0,4 | 1,3 | 3,7 | 21,0 | 32,7 | 3,4 |
| 37° C | 0,7 | 1,6 | 4,8 | 24,7 | 33,8 | 2,1 |
| Lard | 1,4 | 9,7 | 6,1 | 33,3 | 44,0 | 43,0 |
| Maize oil | 3,5 | 0,5 | 0,1 | 13,2 | 15,9 | 83,8 |
| Maize oil, hydrogenated to a melting point of 33° C | 0,9 | 0,1 | 0,4 | 13,0 | 18,5 | 19,5 |
| Olive oil | 2,9 | 0,3 | 0,1 | 11,2 | 13,9 | 86,1 |
| Palm kernel oil | 1,5 | 1,2 | 0,0 | 7,6 | 9,8 | 10,4 |
| Palm oil | 35,8 | 6,0 | 7,0 | 44,5 | 49,4 | 49,6 |
| Palm oil, hydrogenated to a melting point of: | | | | | | |
| 42° C | 14,9 | 2,1 | 8,4 | 45,7 | 51,3 | 21,4 |
| 45° C | 10,5 | 1,2 | 13,0 | 43,3 | 54,5 | 18,0 |
| 58° C | 0,0 | 0,0 | 97,2 | 44,8 | 98,0 | 0,0 |
| Dry-fractionated palm oil olein | 36,0 | 5,0 | 3,9 | 40,8 | 45,6 | 52,3 |

TABLE I-continued
Triglyceride and fatty acid composition of exemplified fats

| Raw material | Triglycerides | | | Fatty Acids | | |
|---|---|---|---|---|---|---|
| | PUP | PPU | Sa₃ | P | Sa | U |
| Dry-fractionated palm oil olein, hydrogenated to a melting point of: | | | | | | |
| 36° C | 13,0 | 2,5 | 5,3 | 40,8 | 48,8 | 28,2 |
| 39° C | 7,5 | 1,5 | 5,4 | 40,8 | 48,9 | 17,4 |
| Rice bran oil | 7,2 | 1,0 | 0,3 | 17,7 | 19,6 | 80,5 |
| Rapeseed oil | 0,5 | 0,0 | 0,0 | 4,2 | 5,2 | 41,0 |
| Rapeseed oil, hydrogenated to a melting point of: | | | | | | |
| 29° C | 0,3 | 0,0 | 0,1 | 4,3 | 10,1 | 26,7 |
| 33° C | 0,2 | 0,0 | 0,4 | 3,7 | 15,2 | 18,0 |
| Safflower oil | 0,9 | 0,5 | 0,1 | 6,9 | 10,2 | 89,4 |
| Safflower oil, hydrogenated to a melting point of 29° C | 0,2 | 0,1 | 0,1 | 6,5 | 9,0 | 22,5 |
| Sunflower oil | 1,0 | 0,1 | 0,0 | 6,5 | 10,0 | 89,8 |
| Sunflower oil, hydrogenated to a melting point of: | | | | | | |
| 33° C | 0,4 | 0,0 | 0,3 | 6,5 | 16,1 | 19,4 |
| 41° C | 0,2 | 0,0 | 2,4 | 6,5 | 28,5 | 15,5 |

Table II

| Composition of margarine fat in % | palm oil (m.p.58° C) + co-randomised mixture of 60% palm oil and 40% sunflower seed oil | |
|---|---|---|
| | 5 + 95 | 2 + 98 |
| | Example I | Control |
| Dilatation (mm/25 g) at a temperature of (° C) | | |
| 10 | 600 | 515 |
| 15 | 480 | 390 |
| 20 | 380 | 290 |
| 30 | 240 | 165 |
| 35 | 150 | 100 |
| P₂U-8 | 8.5 | 8.8 |
| Sa₃ | 9.5 | 6.5 |
| PUP/PPU | 0.9 | 1.2 |
| Graininess after 8 weeks storage at 15° C | 2–3 | 6 |

Table III

| | Composition of Margarine fat (%) | | | |
|---|---|---|---|---|
| | Control | Ex II | Ex III | Ex IV |
| Palm oil | 10 | 10 | — | 10 |
| Palm oil, hydrogenated to a m.p. of 45° C | — | — | 10 | — |
| C°-randomised mixture of 45% palm oil with 55% soyabean oil, hydrogenated to a m.p. of 28° C | 90 | — | 90 | — |
| Co-randomized mixture of 45% palm oil with 55% soyabean oil, hydrogenated to a m.p. of 36° C | — | 90 | — | — |
| Co-randomised mixture of 80% palm oil and 20% soyabean oil, hydrogenated to a m.p. of 36° C | — | — | — | 50 |
| Soyabean oil, hydrogenated to a m.p. of 28° C | — | — | — | 40 |
| PUP/PPU | 0.7 | 0.9 | 0.6 | 0.9 |
| P₂U-8 | 6.3 | 5.1 | 4.2 | 5.0 |
| Sa₃ | 4.2 | 6.3 | 5.3 | 6.1 |
| Graininess | 5 | 2 | 2 | 2 |
| Dilatations in mm³/25 g at a temperature of (° C) | | | | |
| 10 | 750 | 950 | 800 | 780 |
| 20 | 380 | 700 | 450 | 410 |
| 35 | 100 | 150 | 120 | 110 |

TABLE IV

| Example No. | Composition of fat blend, calculated on total fat blend | | Perc. palm-based fat | | PUP/PPU | P₂U | P₂U-8 | Sa₃ | Graininess 15° C |
|---|---|---|---|---|---|---|---|---|---|
| | Co-randomised | Non-randomised | total calc. on total fat blend | co-ran., calc. on total content palm-based fat | | | | | |
| V | 49% palm oil 21% rapeseed oil, hydr. to a m.p. of 29° C | 20% dry-fract. palm oil olein, fract. to a m.p. of 36° C 10% rapeseed oil | 69 | 71% | 0.9 | 11.2 | 3.2 | 4.5 | 2 |
| Control | 32% palm oil 5% dry-fract. palm oil stearin 20% rapeseed oil 20% soyabean oil 15% soyabean oil, hydr. to a m.p. of 36° C | 20% dry-fract. palm oil olein | 57 | 65 | 1.6 | 16.4 | 8.4 | 3.2 | 6 |
| VI | 32% palm oil 5% dry-fract. palm oil stearin 20% rapeseed oil 20% soyabean oil | 20% dry-fract. palm oil, hydr. to a m.p. of 36° C | 57 | 65 | 0.7 | 9.9 | 1.9 | 3.3 | 2 |

TABLE IV-continued

| Example No. | Composition of fat blend, calculated on total fat blend Co-randomised | Non-randomised | Perc. palm-based fat total calc. on total fat blend | co-ran., calc. on total content palm-based fat | PUP/PPU | P₂U | P₂U-8 | Sa₃ | Graininess 15° C |
|---|---|---|---|---|---|---|---|---|---|
| VII | 15% soyabean oil, hydr. to a m.p. of 36° C<br>15% palm oil<br>30% soyabean oil, hydr. to a m.p. of 11° C | 5% palm oil<br>5% palm oil, hydr. to a m.p. of 15° C<br>15% sunflower oil | 55 | 82 | 1.5 | 11.9 | 3.9 | 6.0 | 1 |
| VIII | 15% palm oil<br>30% soyabean oil, hydr. to a m.p. of 36° C | 5% palm oil<br>5% palm oil, hydr. to a m.p. of 45° C<br>15% safflower oil | 55 | 82 | 1.2 | 11.5 | 3.5 | 5.2 | 1 |
| IX | 45% palm oil<br>30% sunflower oil, hydr. to a m.p. of 34° C | 5% palm oil<br>5% palm oil, hydr. to a m.p. of 45° C<br>15% soyabean oil | 55 | 82 | 1.4 | 11.0 | 3.0 | 4.5 | 1 |
| X | 36% palm oil<br>24% safflower oil, hydr. to a m.p. of 20° C | 10% palm oil<br>5% palm oil, hydr. to a m.p. of 45° C<br>10% coconut oil<br>15% sunflower oil | 51 | 58 | 1.3 | 11.4 | 3.4 | 3.6 | 3 |
| XI | 36% palm oil<br>21% rapeseed oil, hydr. to a m.p. of 33° C | 10% palm oil<br>5% palm oil, hydr. to a m.p. of 45° C<br>10% coconut oil<br>15% sunflower oil | 51 | 58 | 1.4 | 10.8 | 2.8 | 4.1 | 2 |
| control | 41% palm oil<br>49% soyabean oil, hydr. to a m.p. of 28° C | 10% palm oil | 51 | 80 | 1.0 | 14.1 | 6.1 | 3.7 | 5 |
| XII | 41% palm oil<br>49% soyabean oil, hydr. to a m.p. of 28° C | 10% palm oil, hydro. to a m.p. of 45° C | 51 | 80 | 0.6 | 11.1 | 3.1 | 4.3 | 2 |
| XIII | 41% palm oil<br>49% 3% soyabean oil, hydr. to a m.p. of 28° C | 7% palm oil<br>palm oil, hydr. to a m.p. of 58° C | 51 | 80 | 0.8 | 12.8 | 4.8 | 6.5 | 2 |
| Control | 30% palm oil<br>12% sunflower oil<br>18% sunflower oil, hydro. to a m.p. of 34° C | 20% dry-fract. palm oil olein<br>10% coconut oil<br>10% olive oil | 50 | 67 | 1.7 | 15.5 | 7.5 | 3.0 | 6 |
| XIV | 30% palm oil<br>12% sunflower oil<br>18% sunflower oil, hydr. to a m.p. of 34° C | 20% dry-fract. palm oil olein, hydr. to a m.p. of 39° C<br>10% coconut oil<br>10% olive oil | 50 | 67 | 0.8 | 8.6 | 0.6 | 3.3 | 1 |
| Control | 36% dry-fract. palm oil olein<br>24% maize oil | 10% dry-fract. palm oil stearin<br>15% maize oil<br>15% soyabean oil, hydr. to a m.p. of 36° C | 46 | 78 | 0.7 | 15.2 | 7.2 | 4.8 | 5 |
| XV | 36% dry-fract. palm oil olein, hydr. to a m.p. of 39° C<br>24% maize oil | 10% dry-fract. palm oil stearin<br>25% maize oil<br>5% soyabean oil, hydr. to a m.p. of 36° C | 46 | 78 | 0.4 | 12.5 | 4.5 | 5.1 | 2 |
| Control | 30% palm oil<br>30% groundnut oil | 15% palm oil<br>25% safflower oil | 45 | 67 | 1.2 | 16.4 | 8.4 | 3.6 | 6 |
| XVI | 30% palm oil<br>30% groundnut oil, hydr. to a m.p. of 37° C | 15% palm oil<br>25% safflower oil | 45 | 67 | 1.7 | 11.4 | 3.4 | 4.0 | 2 |
| XVII | 24% palm oil<br>6% dry-fract. palm oil stearin<br>30% fish oil, hydr. to a m.p. of 37° C | 15% dry-fract. palm oil olein<br>25% sunflower oil | 45 | 67 | 1.4 | 13.0 | 5.0 | 5.5 | 2 |
| Control | 20% dry-fract. palm oil olein | 5% dry-fract. palm oil stearin | | | | | | | |

TABLE IV-continued

| Example No. | Composition of fat blend, calculated on total fat blend | | Perc. palm-based fat | | PUP/PPU | P₂U | P₂U-8 | Sa₃ | Graininess 15° C |
| --- | --- | --- | --- | --- | --- | --- | --- | --- | --- |
| | Co-randomised | Non-randomised | total calc. on total fat blend | co-ran., calc. on total content palm-based fat | | | | | |
| | 15% fish oil, hydr. to a m.p. of 37° C<br>10% rapeseed oil<br>5% soyabean oil | 20% dry-fract. palm oil olein<br>12% fish oil, hydr. to a m.p. of 37° C<br>8% rapeseed oil<br>5% soyabean oil<br>5% dry-fract. palm oil stearin | 45 | 45 | 2.2 | 15.2 | 7.2 | 4.0 | 4 |
| XVIII | 38% dry-fract. palm oil olein<br>28% fish oil, hydr. to a m.p. of 37° C<br>19% rapeseed oil<br>10% soyabean oil | 43 | 85 | 0.7 | 10.6 | 2.6 | 4.0 | 2 | |
| Control | 29% palm oil<br>27% soyabean oil, hydr. to a m.p. of 28° C | 5% palm oil<br>3% palm oil, hydr. to a m.p. of 58° C<br>35% cottonseed oil | 37 | 76 | 1.8 | 15.9 | 7.9 | 5.7 | 4 |
| XIX | 29% palm oil<br>27% soyabean oil, hydr. to a m.p. of 28° C | 5% palm oil<br>3% palm oil, hydro. to a m.p. of 58° C<br>35% rapeseed oil | 37 | 76 | 0.8 | 9.5 | 1.5 | 5.5 | 1 |
| Control | 25% palm oil<br>25% fish oil, hydr. to a m.p. of 33° C | 10% palm oil<br>10% soyabean oil<br>30% lard | 35 | 72 | 0.9 | 14.1 | 6.1 | 5.7 | 6 |
| XX | 25% palm oil<br>25% fish oil, hydr. to a m.p. of 33° C | 10% palm oil<br>10% soyabean oil<br>30% palm kernel oil | 35 | 72 | 1.3 | 11.0 | 3.0 | 4.1 | 2 |
| XXI | 7% palm oil<br>23% maize oil, hydr. to a m.p. of 33° C | 18% palm oil<br>10% palm oil, hydr. to a m.p. of 45° C<br>12% soyabean oil, hydr. to a m.p. of 28° C<br>20% soyabean oil | 35 | 20 | 2.5 | 11.5 | 3.5 | 3.7 | 2 |
| XXII | 29% palm oil<br>38% lard<br>28% fish oil, hydr. to a m.p. of 35° C | 5% palm oil, hydr. to a m.p. of 45° C | 34 | 85 | 0.6 | 13.7 | 5.7 | 7.8 | 2 |

What we claim is:

1. A fat blend containing 30–80 percent of a palm-based fat selected from the group consisting of hydrogenated palm oil, unhydrogenated palm oil and the solid and liquid fractions thereof, 15–85 percent of said palm-based fat is co-randomized with one or more non-palm-based fats and liquids oils of which at least 90% of the triglycerides contain fatty acids of a mean chain length of 44/3 and higher, to provide 25–98 percent of co-randomized constituents in the fat blend, the fat blend having a ratio of 1,3-dipalmitoyl-2-cis-mono- and polyunsaturated fatty acid triglycerides to 1,2-dipalmitoyl-3-cis-mono- and polyunsaturated fatty acid triglycerides of less than 2.8, the content of fatty acid triglycerides having three saturated fatty acids of a mean chain length of 44/3 or higher being greater than the content of dipalmitoyl-cis-mono- and polyunsaturated fatty acid triglycerides minus eight percent.

2. Fat blend according to claim 1 in which 10–100% of the other fat which predominantly consists of $C_{44}$ and higher triglycerides is co-randomised.

3. Fat blend according to claim 1 in which the other fat which predominantly consists of $C_{44}$ and higher triglycerides is partially hydrogenated.

* * * * *

UNITED STATES PATENT AND TRADEMARK OFFICE
CERTIFICATE OF CORRECTION

PATENT NO. : 4,016,302
DATED : April 5, 1977
INVENTOR(S) : Hans Robert Kattenberg et al.

It is certified that error appears in the above-identified patent and that said Letters Patent are hereby corrected as shown below:

Col. 7, Table IV, "Example No. - Control", in column headed "Co-randomised", change "15% soyabean oil, hydr. to a m.p. of 36°C" to -- 3% soyabean oil, hydr. to a m.p. of 36°C. --

Col. 9, Table IV, first entry in column headed "Co-randomised", change "15% soyabean oil, hydr. to a m.p. of 36°C" to -- 3% soyabean oil, hydr. to a m.p. of 36°C. --

Col. 11, Table IV, "Example No. - Control" (following Example XVIII), in column headed "Co-randomised", change "27% soyabean oil, hydr. to a m.p. of 28°C" to -- 28% soyabean oil, hydr. to a m.p. of 28°C. --

Col. 11, Table IV, Example No. XIX, in column headed "Co-randomised" change "27% soyabean oil, hydr. to a m.p. of 28°C" to -- 28% soyabean oil, hydr. to a m.p. of 28°C. --

Col. 11, Table IV, Example XXI, in column headed "Non-randomised", under "20% soyabean oil", add the words -- 10% sunflower oil. --

Signed and Sealed this

Twenty-first Day of November 1978

[SEAL]

Attest:

RUTH C. MASON
Attesting Officer

DONALD W. BANNER
Commissioner of Patents and Trademarks